Nov. 26, 1935.  W. C. STOLLBERG  2,022,442
VALVE ACTUATING MEANS
Filed Oct. 26, 1934
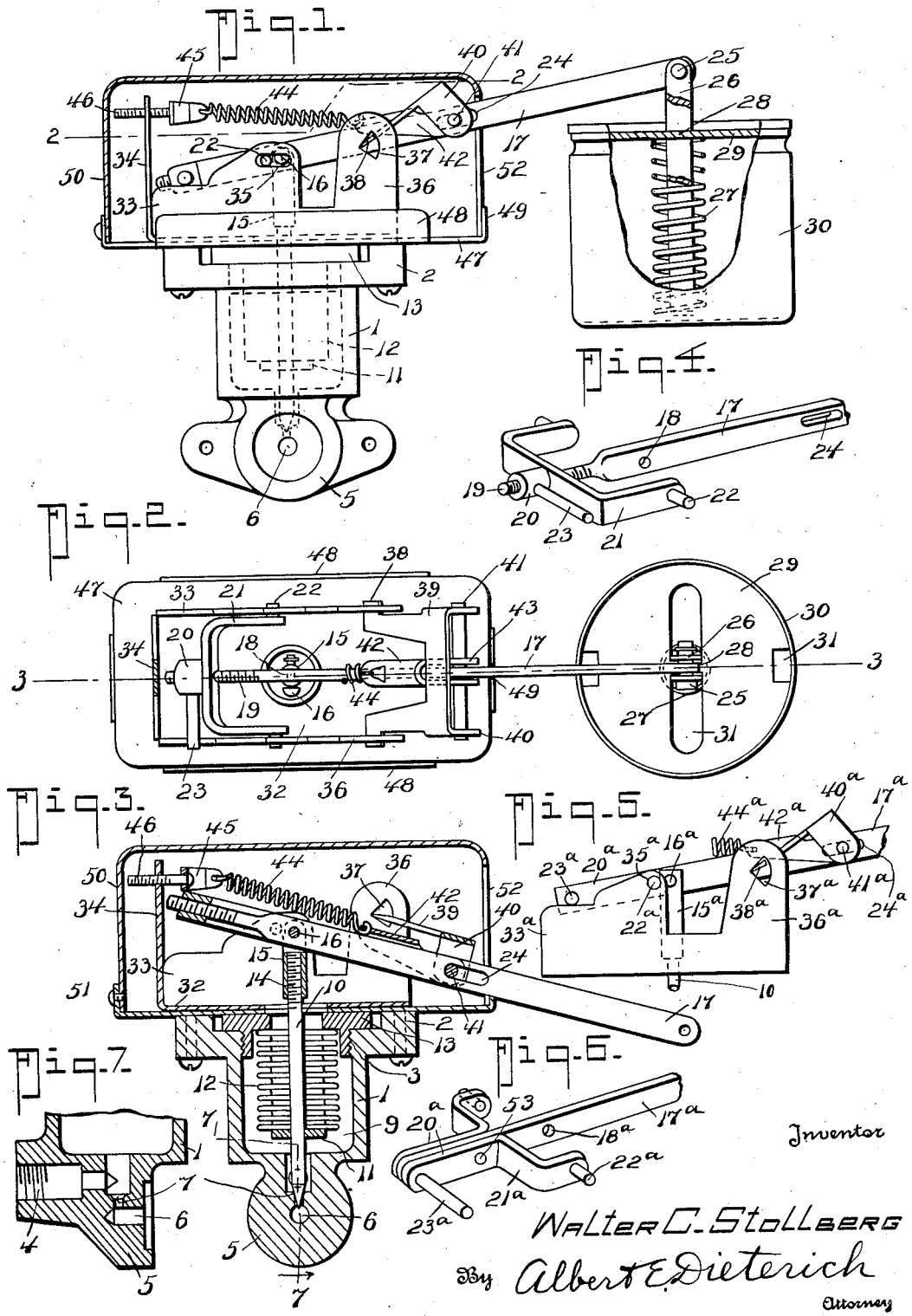
Inventor
Walter C. Stollberg
By Albert E. Dieterich
Attorney Patented Nov. 26, 1935

2,022,442

UNITED STATES PATENT OFFICE 2,022,442

VALVE ACTUATING MEANS

Walter C. Stollberg, Quincy, Ill.

Application October 26, 1934, Serial No. 750,193

5 Claims. (Cl. 74—100)

My invention relates to a certain new and useful device for closing a valve in an oil (or other fluid) line automatically should the supply of fluid delivered through the value to a given place (such as an oil burner, for example) overflow.

Primarily the invention has for its object to provide a simple device for the purpose stated which has provisions for adjustment to operate on the valve, or other controlled object, according to the stroke or movement necessary to impart to said valve, or other object, in order to accomplish the result desired.

Further it is an object to provide a shut-off device for valves which includes an operating lever pivoted to the valve stem and to a suitable fulcrum and including means by which the position of the fulcrum can be adjusted closer to and farther from the axis of the pivot of the lever to the valve stem whereby with a lever movement over a predetermined arc greater or lesser movement may be given to the valve stem or other part operated on.

Further it is an object to provide a shut-off which is held to its "on" and "off" positions by a spring and toggle lever, provisions being made whereby the tension of the spring may be adjusted to keep its action always the same.

Again, it is an object to provide an automatic shut-off in which the lever is moved to the shut-off position by a bucket into which the overflow liquid is deposited, the bucket being resiliently connected to the lever in order to minimize jar and help prevent the bucket acting to trip the lever when there is no discharge of fluid into the bucket.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing in which:—

Figure 1 is a side elevation of an oil burner valve with my invention applied, the cover of the housing or casing being shown in section, and the parts being in the position they assume when the valve is open under normal operation.

Figure 2 is a plan view of the parts shown in Figure 1.

Figure 3 is a vertical longitudinal section on the line 3—3 of Figure 2, showing the lever in the shut-off or down position.

Figure 4 is a detail perspective view of the lever and its fulcrum yoke.

Figure 5 is a detail view of a slight modification.

Figure 6 is a detail perspective view of the modified lever shown in Figure 5.

Figure 7 is a detail section taken on the line 7—7 of Figure 3.

In the drawing, in which like numerals indicate like parts in all of the figures, 1 represents the valve casing which is provided with lugs 2 through which suitable fastening screws pass to secure it to the base 47 of the housing which encloses the operating mechanism that comprises my invention, the housing including a removable cover 50 and adapted to be secured by a screw 51, the base 47 having upturned flanges or ears 48 and 49 to hold the top or cover in place. One end of the cover and one of the ears 49 are slit vertically as at 52, for the passage of the operating lever 17.

The valve casing 1 is of tubular form one end being closed by a screw plug 13 threaded into the casing as at 3. To the screw plug is fastened one end of a bellows 12, the other end of which is fastened to a disk 11 to which the needle valve 10 is secured, the stem of the valve passing up through the bellows 12 and through an aperture in the base 47 and having its upper end threaded as at 14 to receive the threaded collar 15, the upper end of which is split to form ears that straddle the lever 17 and are pivoted to the lever by a pivot pin 16.

The valve casing 1 has a bore 4 which is adapted to be connected to the source of fluid, the bore 4 communicating with a bore 8 that in turn communicates at one end with the interior of the casing 1 which contains the bellows 12 and at the other end communicates through a passage 7 which is provided with a valve seat, with an outlet passage 6. Thus liquid flows, when the valve is not seated, from bore 4 via bore 8, valve passage 7 to outlet passage or bore 6. The passages 4, 6, 7 and 8 are formed in the downwardly projecting portion 5 of the valve casing. The construction of the valve and valve casing is well known and, per se, is not part of my invention.

Mounted within the casing, which is composed of the members 47, 48, 49 and 50, is a support comprising a base 32 having upstanding flanges 33 that are provided with bearing openings 35. Other upstanding support members 36 are provided with bearing openings 37.

Extending upwardly from the base 32 is a post 34.

The lever 17 is preferably provided with a threaded rod portion 19 on which is threaded the trunnion carrying yoke 21, the latter having trunnions 22 to cooperate with the bearings 35. The yoke 21 has a boss 20 which is threaded on the rod 10 and from this boss a stop pin 23 projects so as to engage the upper edge of a flange 33 when the lever 17 is in the up or "valve open" position. 18 is the aperture in the lever 17 through which the pin 16 passes. By reference to Figure 4 it will be noticed that by screwing the yoke 21 along the rod 19 the axis of the trunnions 22 may be brought into alignment with the hole 18 or offset to one side thereof as may be desired. In practice the adjustment of the yoke 21 will depend upon the stroke of the valve 10, that is, if the valve 10 is adjusted for a very slight movement the yoke 21 will be adjusted to bring the trunnion axis nearer alignment with the hole 18 than is the case where the valve 10 is adjusted for a longer stroke. In this way the arc through which the lever 17 moves with the pivot 16 as the pivotal point, does not vary regardless of the adjustments of the valve stroke and of the position of the yoke 21.

The lever 17 is slotted as at 24 for the passage of a pin 41 which is mounted in the ears 40 of a toggle lever 39. This lever 39 has knife-edge trunnions 38 held in the bearing openings 37.

42 is a U-shaped link member straddling the lever 17 and having ears 43 pivoted to the pin 41. One end of a tension spring 44 is connected to the member 42 and the other end is connected to a screw swivel 45 which is threaded at 46 into the boss 34 so that by turning the screw 46 the tension of the spring may be increased or decreased accordingly. Since the tension of the spring acts directly on the pin 41 and through it directly on the toggle lever 40 no spring tension is applied to the lever 17 because the pin 41 operates in the slot 24. Therefore there is no tendency for the spring 44 to pull the lever 17 inwardly at any time.

30 is a bucket having a top 29 that is provided with openings 31 through which the liquid may pass into the bucket to increase the weight thereof. The bucket is pivotally connected with the lever 17 through the medium of a U-shaped bar 26 which straddles a cross piece 28 of the top 29 and is pivoted at 25 to the lever. 27 indicates a light coil spring within the bucket 30, the spring resting in the bend of the bar 26 and the bucket resting with its top 29 on the spring, thus the spring acts as a shock absorber.

Instead of providing the lever 17 with an adjustable fulcrum it may be provided with a fixed fulcrum, as shown in Figures 5 and 6. In these figures those parts which perform the same function and are of corresponding construction to similar parts in the preceding figures have been given the same reference numeral plus the index letter *a* so a detailed description of Figures 5 and 6 is thought to be unnecessary. Suffice it to say the bearing openings 35*a* in this modification of the invention are not elongated as in the preceding form; also the yoke 21 is composed of two members secured to the lever 17 by riveting the pin 23 and providing an additional rivet 53 as indicated in Figure 6.

In operation assume the parts to be as shown in Figure 1 upon depositing overflow liquid on top of the bucket 29 it will pass through the openings 31 into the bucket and as soon as the weight of the bucket and its contents shall have become sufficient to overcome the tension of the toggle spring 44, the lever 17 will be brought downwardly. As soon as the axis 41 reaches a lower level than the fulcrum at 38 the spring 44 will snap the valve 10 shut, thus imparting a rapid closing of the valve. In order to reset the valve it is only necessary to empty the bucket and raise the lever 17.

From the foregoing description, taken in connection with the accompanying drawing, it is though the complete construction, operation and advantages of my invention will be readily understood by those skilled in the art.

What I claim is:

1. In a snap action actuator, a base with supports, a first lever fulcrumed on said supports, a second lever fulcrumed on said supports on an axis spaced from that of the first lever, means slidably pivoting said second lever to said first lever, a spring connected with said second lever and continuously tending to move said levers, stops limiting the movement of said first lever to either of two positions under the influence of said spring, said first lever having provisions for connection to the part to be actuated by the actuator.

2. In a snap action actuator, a base having a pair of parallel supports, a first lever fulcrumed between said supports, a second lever fulcrumed between said supports on a different axis from that of the first lever, said first lever having a slot, a pivot pin passing through said slot and connected to said second lever slidably to pivot said second lever to said first lever, a spring connected to said slidable pivot pin, stops to limit the movement of said levers to either of two positions, said first lever having provisions for connection to the part to be actuated by the actuator.

3. In a snap action actuator, a base with supports, a first lever fulcrumed on said supports, a second lever fulcrumed on said supports on an axis spaced from that of the first lever, means slidably pivoting said second lever to said first lever, a spring connected with said second lever and continuously tending to move said levers, stops limiting the movement of said first lever to either of two positions under the influence of said spring, said first lever having provisions for connection to the part to be actuated by the actuator, and means to shift the fulcrum of said first lever toward and from the fulcrum of said second lever without effecting the position of the slidable pivot connection.

4. In a snap action actuator, a base having spaced supports, a first lever located between said supports, a trunnion yoke carried by said first lever and having bearings in said supports as a fulcrum for said first lever, a second lever fulcrumed between said supports and overlying said first lever, said first lever having a slot, a pivot pin passing through said second lever and through said slot thereby providing a slidable pivotal connection between said levers, a link connected to said pivot pin, a spring connected to said link, means to hold said spring under tension whereby said spring continuously tends to move said pin along said slot, and stops limiting the movement of said levers under the influence of said spring, said first lever being the actuating lever for the part to be actuated by the actuator.

5. In a snap action actuator, a base having spaced supports, a first lever located between said supports, a trunnion yoke carried by said first lever and having bearings in said supports as a fulcrum for said first lever, a second lever fulcrumed between said supports and overlying said first lever, said first lever having a slot, a pivot pin passing through said second lever and through said slot thereby providing a slidable pivotal connection between said levers, a link connected to said pivot pin, a spring connected to said link, means to hold said spring under tension whereby said spring continuously tends to move said pin along said slot, stops limiting the movement of said levers under the influence of said spring, said first lever being the actuating lever for the part to be actuated by the actuator, and means to adjust said yoke on said first lever to vary the position of the fulcrum of said first lever on said support without substantially changing the relative positions of said first and second levers.

WALTER C. STOLLBERG.